(12) United States Patent
Oishi

(10) Patent No.: US 6,317,032 B1
(45) Date of Patent: Nov. 13, 2001

(54) APPARATUS FOR INFORMING A USER OF PREDETERMINED CONDITION BY VIBRATION

(75) Inventor: Hirokazu Oishi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/449,906

(22) Filed: Dec. 2, 1999

(30) Foreign Application Priority Data

Dec. 14, 1998 (JP) .................................................. 10-354033

(51) Int. Cl.⁷ ...................................................... H04Q 1/30
(52) U.S. Cl. ...................................... 340/311.1; 340/407.1
(58) Field of Search ............................ 340/407.1, 311.1, 340/825.44, 825.46; 310/38, 80, 81

(56) References Cited

U.S. PATENT DOCUMENTS

| | | | |
|---|---|---|---|
| 5,175,459 | * 12/1992 | Danial et al. | 340/407.1 |
| 5,436,622 | * 7/1995 | Gutman et al. | 340/407.1 |
| 5,619,181 | * 4/1997 | Murray | 340/407.1 |
| 5,668,423 | * 9/1997 | You et al. | 340/407.1 |
| 5,903,071 | * 5/1999 | Miyasaka et al. | 310/38 |

* cited by examiner

Primary Examiner—Van T. Trieu
(74) Attorney, Agent, or Firm—Sughrue, Mion, Zinn, Macpeak & Seas, PLLC

(57) ABSTRACT

An apparatus for informing a holder or user of the apparatus of a predetermined state by providing a vibratory sensation to the holder or user. The vibrations produced by the apparatus produces in a manner so as to prevent substantial movements of the apparatus even when left unattended. The apparatus includes a motor attached to a housing and a controller for actuating the motor to rotate a shaft. The controller actuates the motor to rotate the shaft in forward and reverse directions alternately at predetermined intervals in response to reception of an incoming signal.

16 Claims, 5 Drawing Sheets

APPARATUS FOR INFORMING A USER OF PREDETERMINED CONDITION BY VIBRATION

BACKGROUND OF THE INVENTION

1. Field of the Invention

This invention relates to an apparatus for portable equipment such as a cellular phone, a beeper, or a portable electronic device having a timer function, in particular, an apparatus for informing a user of predetermined incoming information such as a call or a set time by vibrations.

2. Description of the Related Art

A cellular phone with a vibrator function is well known. The phone serves to inform its holder of an incoming call not only by tone but also by vibrations of the phone housing.

The cellular phone includes a motor (vibrator) attached in a housing and having an eccentric weight. The eccentric weight has a center of gravity deviated from a rotary shaft of the motor by a predetermined distance. Thus, the vibrator function is achieved as follows. First, the rotation of the motor in one direction in response to an incoming call rotates the eccentric weight in the circumferential direction of a predetermined radius about the rotary shaft. Therefore, the housing to which a stator of the motor is attached receives the reaction force generated by the movement of the eccentric weight to forceably vibrate itself. Then, the vibration can directly propagate to a user to inform him/her of the incoming call. The vibrator function is suitable when the user wants to perceive an incoming call without troubling adjacent people with the sound tone.

To enable the user of the cellular phone to sense the vibration of the housing of the cellular phone to perceive the incoming call, he/she has to always hold the cellular phone in such a manner that a part of his/her body is in contact with the housing. When the user leaves the cellular phone on a table or away from his/her body, and when the cellular phone vibrates the housing in response to an incoming call, the cellular phone may experience substantial movement due to the vibration from the original position on the table. As a result, the phone may sometimes drop from the table.

OBJECTS AND SUMMARY OF THE INVENTION

In order to overcome the above problems, a main object of the invention is to provide an apparatus for informing a user of the reception of predetermined information by means of the vibration, which can stay within only a predetermined area from the original position upon receiving an incoming call.

According to one aspect of the invention, the present invention features an apparatus for vibrating itself to inform a user of the reception of predetermined information. The apparatus comprises a housing, a motor attached to a housing, a shaft rotatably driven by the motor, and means for rotating the shaft to vibrate the housing, wherein the means for rotating rotates said shaft in forward and reverse directions alternately at predetermined intervals in response to the reception. Therefore, when the apparatus receives predetermined incoming information such as a call, the shaft then rotates in forward and reverse directions alternately at predetermined intervals to vibrate the housing, thereby informing a user of the reception of the predetermined information.

Even when the apparatus is left on a table without being directly held by the user, the housing is subjected to forces generated by rotating the shaft in forward and reverse directions alternately at predetermined intervals. Thus, the apparatus can stay on the table while vibrating around an original position on which the apparatus is positioned. As a result, the apparatus is protected from substantial movement from the original position.

BRIEF EXPLANATION OF THE DRAWINGS

The aforementioned aspects and other features of the invention are explained in the following description, taken in connection with the accompanying drawing figures wherein.

DETAILED DESCRIPTION OF THE PREFERRED EMBODIMENT

Preferred embodiments of the invention will now be described hereinbelow with reference to the drawings.

Figure 1:
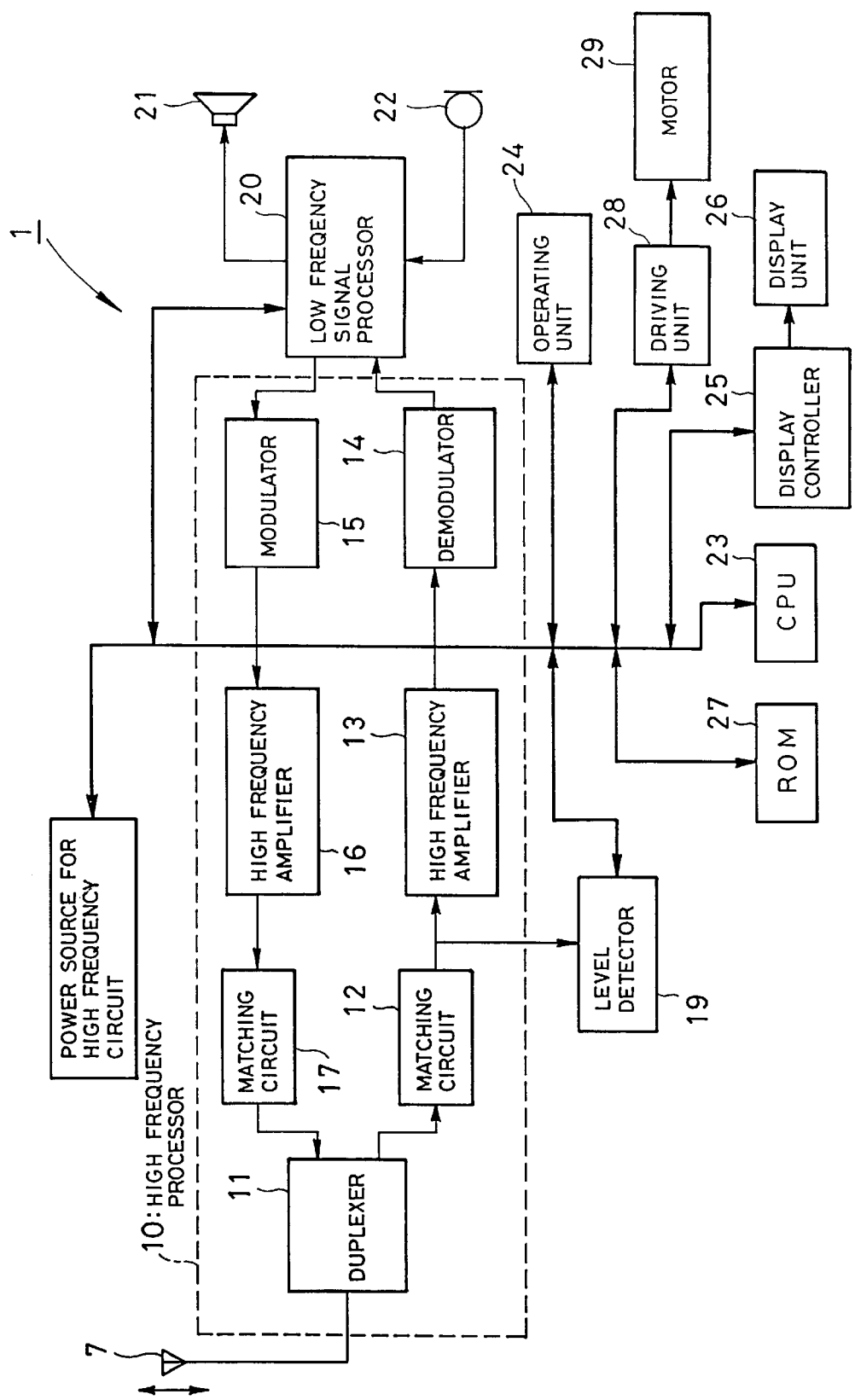
FIG. 1 is a block diagram showing a cellular phone with one embodiment of an apparatus according to the invention.

FIG. 1 is a block diagram showing a cellular phone 1 including one embodiment of an apparatus according to the invention.

Referring to FIG. 1, the cellular phone 1 includes an antenna 7, and a high frequency signal processor 10 in a housing 1a. The high frequency signal processor 10 comprises a DPX (duplexer) 11, matching circuit 12, a high frequency amplifier 13, a demodulator 14, a modulator 15, a high frequency amplifier 16, and a matching circuit 17.

The antenna 7 receives signals, and transmits the signals to the DPX 11 operating as a branching filter. The DPX 11 extracts only the received signals and supplies the extracted signals to the high frequency amplifier 13 via the matching circuit 12. The high frequency amplifier 13 amplifies an input signal by a predetermined gain to supply the amplified signal to the demodulator 14. The demodulator 14 then converts the amplified signal to a lower frequency signal as an audio frequency signal. The low frequency signal processor 20 amplifies the demodulated signal. The resultant signal is emitted as the received tone from a speaker 21.

The high frequency signal processor 10 includes a level detector 19 to detect intensity (level) of the received signal. A CPU 23 controls a display controller 25 to display the intensity (level) of the received signal onto a display unit 26.

A voice signal (transmission tone) supplied through a microphone 22 is amplified by a low frequency signal processor 20, and then modulated to a transmission signal by the modulator 15. The high frequency signal modulated to a transmission signal is amplified by the high frequency amplifier 16. The amplified signal is then supplied from the DPX 11 to the antenna 7 via the matching circuit 17, and radiated as a transmission signal.

The CPU 23 not only controls an operation regarding the operations upon transmission and reception of the cellular phone 1, but also produces a reception tone from a speaker (not shown) in response to an incoming call to inform a user that the phone is receiving the call. The CPU 23 further controls the display controller 25 by means of ten-key buttons provided on an operating unit 24 upon transmission, thereby allowing the telephone number of a partner to be displayed on the display unit 26. It is noted that a program regarding the operation for the CPU has previously been stored in a ROM 27.

The CPU 23 has another function for informing the user that the cellular phone 1 is receiving a call by means of vibration of the housing 1a in place of the reception tone in response to a command from the operating unit 24.

Therefore, when a command to turn on a vibrator is sent from the operating unit 24 to the CPU 23, the CPU 23 controls the low frequency signal processor 20 in response to an incoming call to stop the transmission of the reception tone to the speaker. The CPU 23 then controls a driving unit 28 which activates a motor 29 fixed to the housing 1a so as to repeat a set of forward and reverse motor rotations, so as to vibrate the housing and inform the user of the incoming call.

Figure 2A:
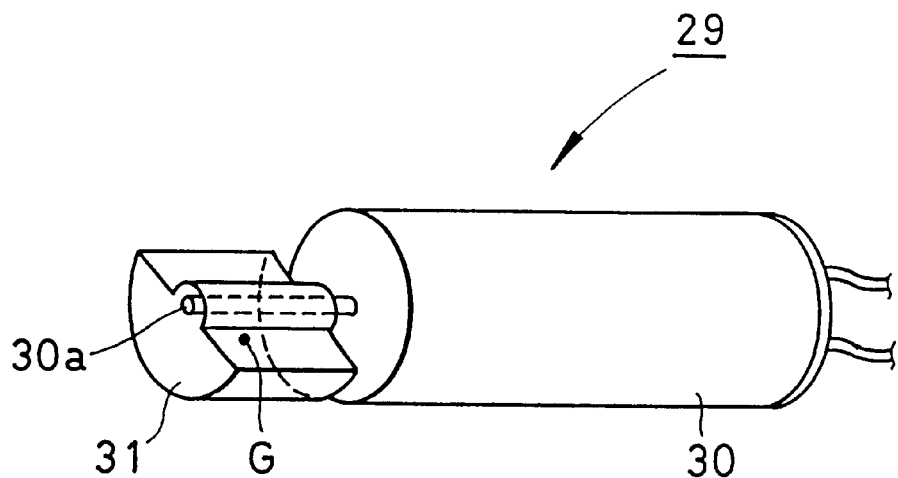
FIG. 2A is a perspective view of a motor.
Figure 2B:
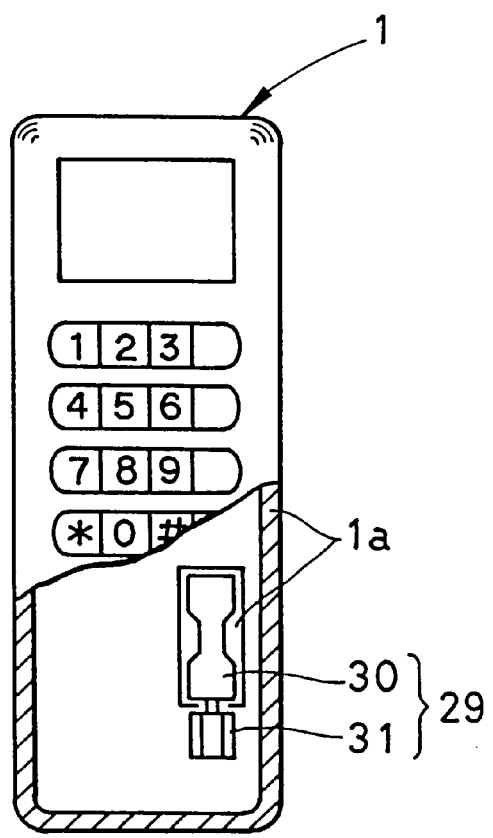
FIG. 2B is a front view of the motor.

FIG. 2A is a perspective view of a motor 29. FIG. 2B is a front view showing the motor 29 installed in the housing 1. As shown in FIG. 2A, the motor 29 comprises a cylindrical DC motor 30 and an eccentric weight 31 integrally fixed to a rotary shaft 30a of the motor 30. The eccentric weight 31 has an asymmetric shape with respect to the rotary shaft 30a. The eccentric weight 31 also has a center of gravity (center of mass) G misaligned from an axial center of the rotary shaft 30a.

The motor 29, which is installed in the housing 1a, has a motor housing, i.e. a stator of the motor 30 attached integrally with the housing 1a. The driving unit 28 supplies a drive control signal to the motor 29 in response to an incoming call to drive the motor 29.

Figure 3A:
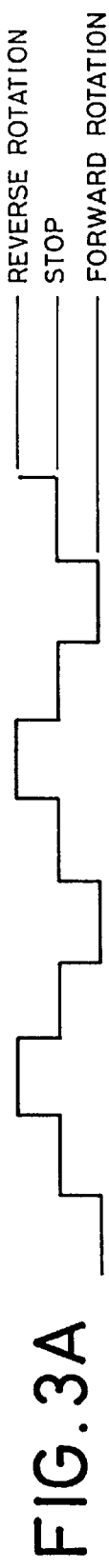
FIGS. 3A–3B are diagrams showing waveforms of signals to drive the motor by the driving unit in response to an incoming call.
Figure 3B:
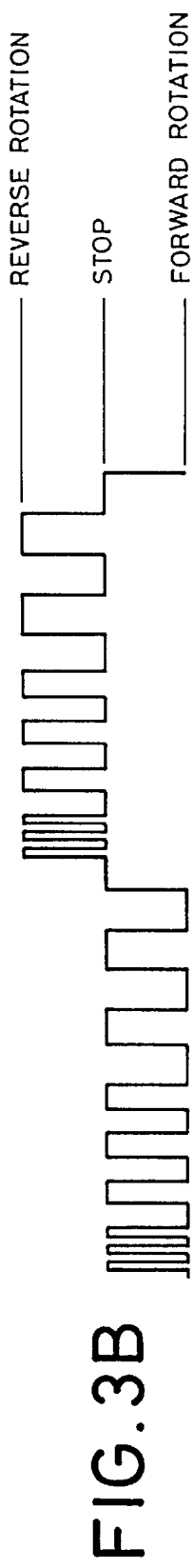

FIGS. 3A and 3B are diagrams showing waveform examples of the drive control signal to drive the motor 29 in response to an incoming call. FIG. 3A shows a waveform in the case where a control signal for the forward rotation of the motor 29 and a control signal for the reverse rotation are alternately repeatedly applied at the same rotating period.

FIG. 3B shows another waveform in the case where the control signal for the forward rotation and the control signal for the reverse rotation are alternately applied at the same rotating period, and the rotating period is repetitively changed at a predetermined period with respect to the time.

The driving unit 28 supplies the drive control signal to the motor 29 to drive a rotor 30 of the motor including the rotary shaft 30a integral with the eccentric weight 31, thereby repeating the forward rotation and the reverse rotation of the motor and the weight. The stator receives the vibration caused by those rotations to vibrate together with the housing 1a, which causes the cellular phone 1 to vibrate to inform the user of the incoming call.

A vibration of the cellular phone 1 in response to an incoming call will now be described in detail. Explanation will be made on the assumption that the cellular phone 1 with a vibrator for informing a user of an incoming call is activated and is left on a horizontal table, and receives an incoming call.

FIGS. 4A–4D are vertical sectional views showing the motor 29 attached in the housing 1a. The cellular phone 1 is placed on a table. As positioned, the center of gravity G of the eccentric weight 31 moves about its rotary shaft 30a in accordance with the rotation of the motor 29.

FIGS. 4A–4D sequentially show positions of the center of gravity G of the eccentric weight 31 for every 90° change about the rotary shaft 30a when the motor 29 rotates in the direction shown by an arrow (solid line; forward rotation) once. When the eccentric weight 31 rotates in one direction around the rotary shaft 30a as mentioned above, each state of FIGS. 4A–4D is repeated every 90° of rotation. As angular velocity of the rotation is gradually increasing, a centrifugal force applied to the rotary shaft 30a gradually increases. Therefore, the housing 1a having the motor 29 attached thereto receives the force.

Figure 4A:
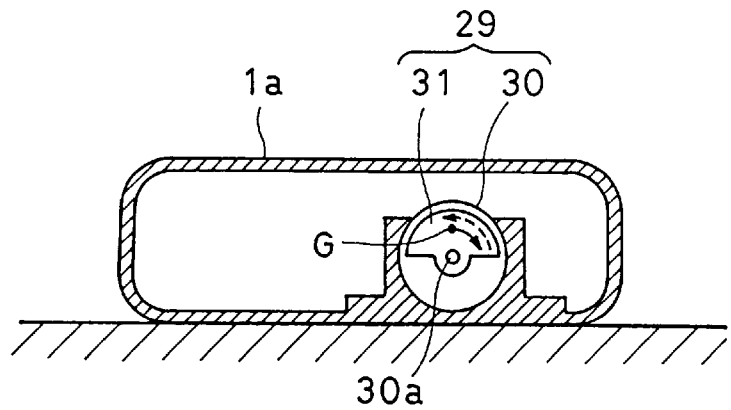
FIGS. 4A–4D are schematic views showing the rotation of the motor in which the center of gravity G of an eccentric weight is moving.
Figure 4B:
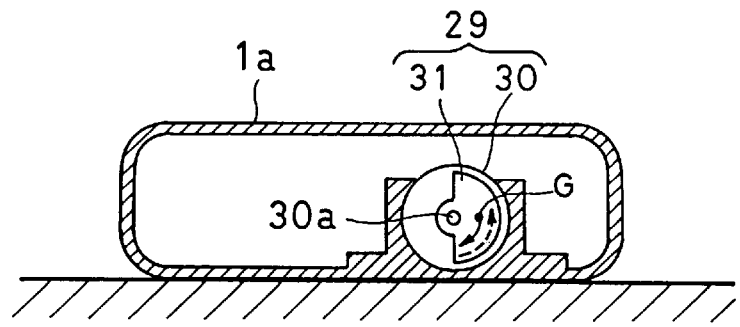
Figure 4C:
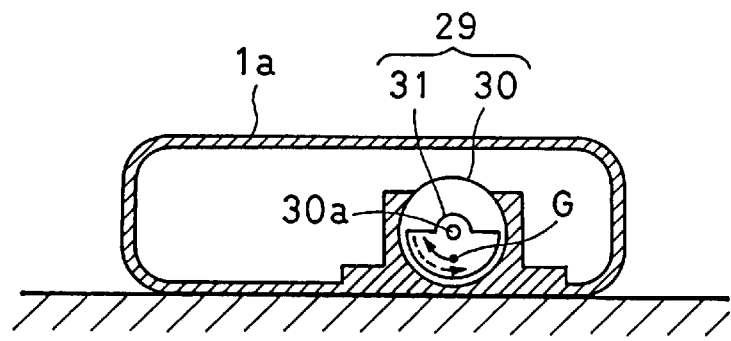
Figure 4D:
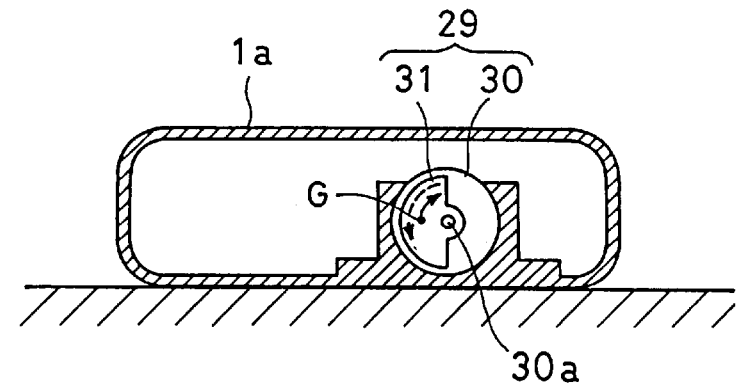

In FIG. 4A, the housing 1a receives a vertically upward force with respect to the table surface. In FIG. 4B, the housing 1a receives a horizontal right-direction force with respect to the table surface. In FIG. 4C, the housing 1a receives a vertically downward force with respect to the table surface. In FIG. 4D, the housing 1a receives a horizontal left-direction force with respect to the table surface.

That is, by repeating the states of FIGS. 4A and 4C every rotation of the rotary shaft 30a, the housing 1a repetitively receives the vertically upward/downward force with respect to the table surface. By repeating the states of FIGS. 4B and 4D, the housing 1a repetitively receives the force in the horizontal right/left directions with respect to the table surface. The housing 1a on the table alternately repeats the upward movement with respect to the table and the horizontal directions movement to vibrate itself every rotation of the motor.

In the motor 29, the rotor rotates due to the magnetic interaction between the stator and the rotor, and the stator receives its reaction force. When the rotor forwardly rotates, the stator receives the opposite force (which has a direction of an arrow shown by a broken line in FIGS. 4A–4D). The housing 1a to which the stator of the motor is attached, consequently, receives the force in the direction opposite to the rotating direction of the rotary shaft 30a about the rotary shaft 30a.

Figure 5A:
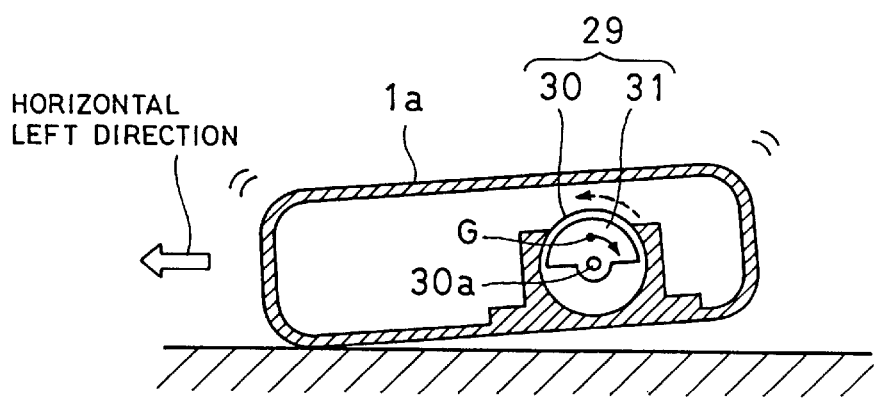
FIGS. 5A–5B are schematic diagrams showing a force applied to a cellular phone when the shaft of the motor is rotating in one direction.
Figure 5B:
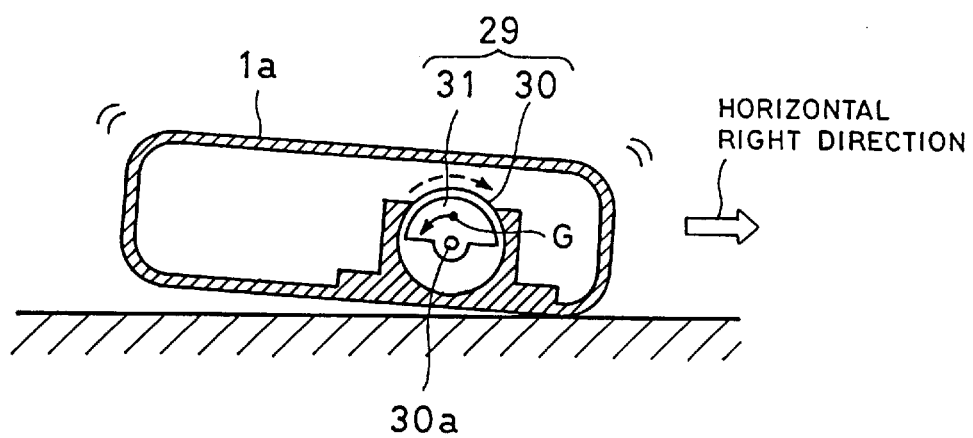

FIGS. 5A–5B are schematic views of the housing 1a of the cellular phone 1 receiving the force during the period in which the motor 29 is rotating in one direction. FIG. 5A shows the motor 29 rotating forwardly. FIG. 5B shows the motor 29 rotating reversely.

As mentioned above, when the rotary shaft 30a rotates forwardly, the housing 1a alternately repeats the upward movements with respect to the table and the horizontal-direction movements every rotation of the rotary shaft 30a due to the force caused by the rotation of the eccentric weight 31, thereby vibrating itself. At the same time, the housing 1a also receives the force in the direction opposite to the rotating direction of the eccentric weight 31 about the rotary shaft 30a. As shown in FIG. 5A, therefore, the housing 1a moves in the horizontal left direction, vibrating in the upper/lower and right/left directions on the table surface.

When the rotary shaft 30a reversely rotates, the housing 1a alternately repeats the upward movement with respect to the table and the horizontal-direction movement to vibrate every rotation of the rotary shaft 30a due to the force caused by the rotation of the eccentric weight 31. At the same time, the housing 1a also receives the force in the direction opposite to the rotating direction of the eccentric weight 31 about the rotary shaft 30a. As shown in FIG. 5B, therefore, the housing 1a moves in the horizontal-right direction while vibrating in the upper/lower and right/left directions on the table surface.

Described above, the driving unit 28 in a cellular phone 1 provided with an activated vibrator drives the motor 29 in accordance with a command from the CPU 23 in response to an incoming call to rotate the rotor of the motor 30 in the forward direction and the reverse direction alternately. Consequently, the vibration occurring due to the rotations causes the stator to vibrate together with the housing 1a, so that the cellular phone 1 vibrates and informs the holder or user of the phone of the incoming call.

The rotor of the motor and the integral eccentric weight 31 repeat the forward rotation and the reverse rotation. Therefore, even if the cellular phone 1 is left on a table when receiving an incoming call, the cellular phone repeats the reciprocation in the horizontal right/left directions on the table about the rotary shaft 30a while vibrating itself. By properly setting the periods of the forward rotation and the reverse rotation, the cellular phone move only within a predetermined area from the position in which it is originally left.

In the above embodiment, the CPU 23 supplies the drive control signal to control the driving unit 28 in response to an incoming call and notifies the holder or user of the incoming call. It should be noted that the apparatus according to the invention is not limited to that shown in the diagram. It is within the scope of the invention to provide an apparatus of the present invention including a timer for informing a predetermined state such as a preset time.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An apparatus for vibrating itself to inform a user of the reception of predetermined information, said apparatus comprising;

a housing, a motor attached to said housing, a shaft rotatably driven by said motor, and means for rotating said shaft to vibrate said housing, wherein said means for rotating rotates said shaft in forward and reverse directions alternately at predetermined intervals in response to said reception.

2. An apparatus as set for in claim 1, wherein said means for rotating comprises a weight fixed to said shaft for rotating about said shaft, said weight having a center of gravity misaligned with said rotary axis.

3. An apparatus as set forth in claim 1, wherein said reception of predetermined information is an incoming call.

4. An apparatus for vibrating itself on receiving predetermined information, said apparatus comprising:

a motor, a shaft rotatably driven by the motor, and a driving circuit for driving the motor, wherein said driving circuit causes said motor to rotate said shaft alternately in forward and reverse directions at consecutive intervals.

5. The apparatus as claimed in claim 4, wherein said driving circuit drives said motor by outputting a drive control signal at least indirectly to said motor, wherein a first portion of said drive control signal causes said shaft to rotate in said forward direction and a second portion of said drive control signal causes said shaft to rotate in said reverse direction, and wherein said first portion and said second portion of said drive control signal are alternatively and repeatedly applied to said motor.

6. The apparatus as claimed in claim 5, wherein a period of said first portion of said drive control signal is substantially constant, and wherein a period of said second portion of said drive control signal is substantially constant.

7. The apparatus as claimed in claim 6, wherein said period of said first portion of said drive control signal is substantially equal to said period of said second portion of said drive control signal.

8. The apparatus as claimed in claim 5, wherein a period of said first portion of said drive control signal is repetitively changed at a predetermined period with respect to time.

9. The apparatus as claimed in claim 8, wherein said period of said first portion of said drive control signal is substantially equal to said period of said second portion of said drive control signal.

10. The apparatus as claimed in claim 4, further comprising a weight that is fixedly coupled to said shaft.

11. The apparatus as claimed in claim 10, wherein said weight has an asymmetric shape with respect to a rotational axis of said shaft.

12. The apparatus as claimed in claim 10, wherein said weight has a center of gravity that is offset from an axial center of said shaft.

13. The apparatus as claimed in claim 4, wherein said driving circuit drives said motor when a predetermined event occurs, and wherein said predetermined event is a reception of an incoming transmission.

14. The apparatus as claimed in claim 13, wherein said incoming transmission is a telephone call.

15. The apparatus as claimed in claim 4, wherein said driving circuit drives said motor when a predetermined event occurs, and wherein said predetermined event is an occurrence of a predetermined time.

16. The apparatus as claimed in claim 4, wherein said driving circuit drives said motor when a predetermined event occurs and wherein said shaft rotates at least 360° in said forward direction and rotates at least 360° in said reverse direction when said predetermined event occurs.

* * * * *